United States Patent [19]
Kusase et al.

[11] Patent Number: 5,780,996
[45] Date of Patent: Jul. 14, 1998

[54] ALTERNATING CURRENT GENERATOR AND SCHOTTKY BARRIER DIODE

[75] Inventors: Shin Kusase, Obu; Atsushi Umeda, Anjo; Makoto Taniguchi, Obu, all of Japan

[73] Assignee: Nippondenso Co., Ltd., Kariya, Japan

[21] Appl. No.: 667,307

[22] Filed: Jun. 21, 1996

[30] Foreign Application Priority Data

Jun. 23, 1995 [JP] Japan ..................... 7-158124

[51] Int. Cl.$^6$ .................................... H02P 9/00
[52] U.S. Cl. ......................... 322/28; 322/25; 322/27
[58] Field of Search .......................... 322/25, 27, 28

[56] References Cited

U.S. PATENT DOCUMENTS

| | | | |
|---|---|---|---|
| Re. 29,245 | 5/1977 | Minks | 315/78 |
| 3,781,632 | 12/1973 | Charboneau | 320/39 |
| 4,733,159 | 3/1988 | Edwards et al. | 323/282 |
| 5,510,972 | 4/1996 | Wong | 363/127 |
| 5,604,653 | 2/1997 | Pezzani et al. | 361/20 |
| 5,604,655 | 2/1997 | Ito | 361/56 |
| 5,608,616 | 3/1997 | Umeda et al. | 363/132 |

FOREIGN PATENT DOCUMENTS

| | | |
|---|---|---|
| 62-200169 | 12/1987 | Japan . |
| 4-138030 | 5/1992 | Japan . |

OTHER PUBLICATIONS

Palmour, et al: "6H–Silicon Carbide Power Devices for Aerospace Applications" Proceedings of the 28th Intersociety Energy Conversion Engineering Conference, IECEC–93, Aug. 8–13, 1993, Atlanta, Georgia, vol. 1, pp. 1249–1254.

*Primary Examiner*—Steven L. Stephan
*Assistant Examiner*—Nicholas Ponomarenko
*Attorney, Agent, or Firm*—Cushman Darby & Cushman IP Group of Pillsbury Madison & Sutro LLP

[57] ABSTRACT

Rectifying elements that constitute a full-wave rectifier of an on-vehicle alternator are constituted by Schottky barrier diodes. The Schottky barrier diode has on one hand the drawback that rectifying characteristics thereof deteriorate due to the heat generation resulting from large avalanche breakdown current that is produced due to surge voltage, with the result that leakage current that occurs when reverse voltage is applied increases. However, according to the present invention, since the surge voltage is absorbed by a voltage regulation diode connected in parallel with the Schottky barrier diode, the voltage regulation diode is broken down when surge voltage has been applied. Accordingly, it does not happen that reverse voltage that exceeds the breakdown voltage of the voltage regulation diode is applied to the Schottky barrier diode. Therefore, it does not happen that the current due to surge voltage exceeding the breakdown voltage thereof flows in the Schottky barrier diode.

14 Claims, 8 Drawing Sheets

ALTERNATING CURRENT GENERATOR AND SCHOTTKY BARRIER DIODE

CROSS REFERENCE TO RELATED APPLICATION

This application is based upon and claims the benefit of priority of the prior Japanese Patent Application No. 7-158124 filed on Jun. 23, 1995, the contents of which are incorporated herein by reference.

BACKGROUND OF THE INVENTION

1. Field of the Invention

The present invention relates to an alternating current generator (hereinafter, simply referred to as "alternator"). More particularly, the present invention relates to an on-vehicle alternator which has a rectifier that uses Schottky barrier diodes as the rectifying elements.

2. Related Arts

A conventional on-vehicle alternator performs rectification with the use of a three-phase full-wave rectifier constructed using junction diodes. Furthermore, Unexamined Japanese Patent Application Laid-open No. 4-138030 has proposed a three-phase full-wave rectifier whose rectifying elements are constructed using MOS transistors. A rectifier which uses Schottky barrier diodes that are smaller in forward voltage drop than junction diodes is also known.

In conventional rectifying elements each constituted by a Si junction diode, a forward voltage drop Vd of approximately 0.8 V or so occurs. Therefore, during passage therethrough of heavy current, a large heat (Vd·i) is generated in each rectifying element. Assuming that the chip area be fixed, the increase in internal temperature due to generation of this large heat determines a limit with respect to the output current. Although the limit with respect to the output current can of course be improved by contrivance of the cooling performance, improvement thereof up to a level higher than some appreciable level is not easy. Also, the above-mentioned large forward voltage drop is problematic also in the respect of limiting the improvement of the rectifying efficiency.

When using MOS transistors as the rectifying elements, while there is on one hand the advantage of the above-mentioned forward voltage drop of the pn junction being able to be avoided, there is on the other hand the problem of the control circuit and manufacturing process becoming complex.

When using Schottky barrier diodes as the rectifying elements, the forward voltage drop thereof and the resulting power loss and generated heat are each smaller than those in the case of junction diodes. Therefore, if the chip area and the cooling performance are equal, the limit with respect to the output current can advantageously be improved by that extent and also a high rectifying efficiency advantageously is obtained. Further, the peripheral circuit and manufacturing process can advantageously be very much simplified compared to the case of using MOS transistors.

However, while, on one hand, the conventional on-vehicle alternator has the specific nature that large surge current that is generated due to on/off control of the field current, rapid change in the rotational speed, connection to and disconnection from the loads, etc., or that is induced from an engine igniter device is superimposed on the generated current voltage to be rectified, in contrast thereto ordinary Schottky barrier diodes on the other hand has the property that their rectifying characteristics are likely to deteriorate in comparison with the case of using the pn junction diodes due to surge voltage for the reason that they have junction structures composed of materials differing in physical properties, etc. Therefore, using of conventional Schottky barrier diodes as the rectifying elements in the rectifier of the on-vehicle alternator was conventionally difficult.

SUMMARY OF THE INVENTION

The present invention has been made in view of the above and an object of the present invention is to provide an alternator which can realize decrease in the internal heat generated from the rectifying elements and increase in the rectifying efficiency without being followed by decrease in the reliability with respect to high surge voltage specific for the generator and complexity of the peripheral circuit and manufacturing process, as well as Schottky barrier diodes that are suitable as the rectifying elements.

In order to attain the above object, according to the present invention, there is provided an alternator comprising: means for generating polyphase alternating current, having output terminals connected to polyphase armature windings; a full-wave rectifier including first rectifying elements on a high potential side, anodes of which are connected individually to the respective output terminals of the polyphase armature windings and cathodes of which are connected individually to a high potential terminal of a battery, and second rectifying elements on a low potential side, cathodes of which are connected individually to the respective output terminals of the polyphase armature windings and anodes of which are connected individually to a low potential terminal of the battery, wherein at least one of the first and second rectifying elements are constituted by Schottky barrier diodes; and means for absorbing surge voltage applied to the Schottky barrier diodes, disposed to form a bypass for the surge voltage to bypass the Schottky barrier diodes.

As the surge voltage absorbing means a voltage regulation diode whose breakdown voltage is selected so as to be lower than a breakdown voltage of the Schottky barrier diodes can be utilized.

Furthermore, a Schottky barrier diode according to the present invention is characterized by comprising: a semiconductor substrate of a first conductivity type as a cathode; a metal contacting the semiconductor substrate to form Schottky barrier junction with the semiconductor substrate as an anode, whereby a Schottky barrier diode structure is formed; and a guard ring of a second conductivity type, disposed on the semiconductor substrate to surround the Schottky barrier junction, and ohmically contacting the metal, whereby a pn junction is defined between the semiconductor substrate and the guard ring, and wherein the pn junction is formed to serve as a voltage regulation diode structure.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PRESENTLY PREFERRED EXEMPLARY EMBODIMENTS

Figure 1:
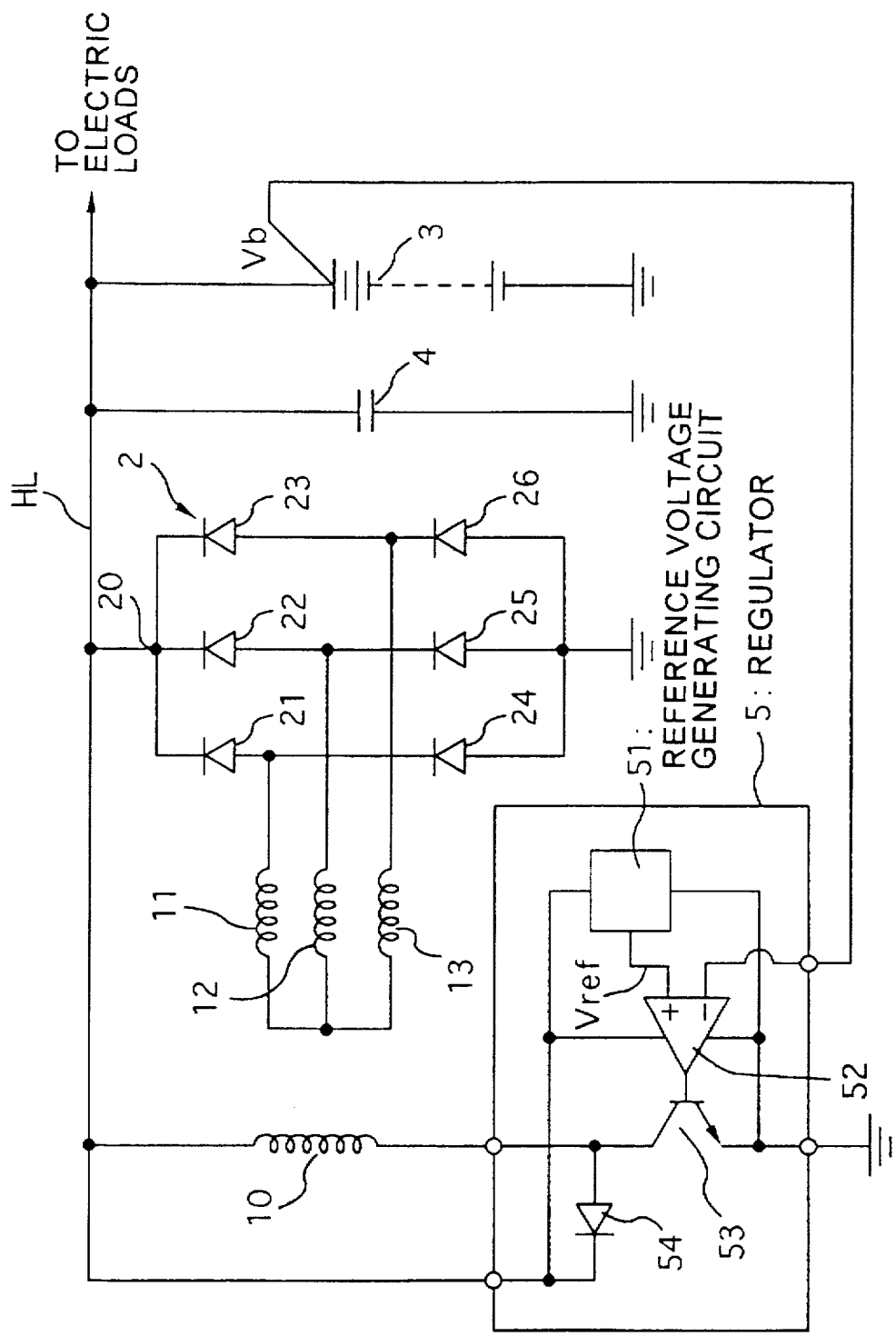
FIG. 1 is a circuit diagram illustrating an on-vehicle alternator according to a first embodiment of the present invention.

First, advantageous aspects of the present invention will be briefly explained.

An on-vehicle alternator according to a first aspect of the present invention is characterized by: a full-wave rectifier including a large number of rectifying elements on a high potential side, anodes of which are connected individually to respective output terminals of polyphase armature windings and cathodes of which are connected individually to a high potential terminal of a battery, and a large number of rectifying elements on a low potential side, cathodes of which are connected individually to the respective output terminals and anodes of which are connected individually to a low potential terminal of the battery, at least one potential side of both the rectifying elements being constituted by Schottky barrier diodes; and surge voltage absorbing means disposed in a circuit bypassing the Schottky barrier diodes to thereby absorb surge voltage applied to the Schottky barrier diodes in reverse direction thereof.

That is, according to the first aspect of the present invention, the rectifying elements on the high potential side or low potential side that constitute the full-wave rectifier of the on-vehicle alternator are constructed using the Schottky barrier diodes. The Schottky barrier diode has the drawback that the physical properties at the Schottky barrier junction interface thereof vary due to, for example, the heat generated as a result of the large avalanche breakdown current that is produced upon application of surge voltage, with the result that the leakage current that is produced when reverse voltage is applied increases inconveniently. In contrast, in this construction, since the surge voltage absorbing means provided in the circuit bypassing the Schottky barrier diodes, such as a voltage regulation diode, absorbs the surge voltage, it does not happen that reverse voltage that exceeds the breakdown voltage of the voltage regulation diode is applied to the Schottky barrier diode. Nor does it happen that accordingly the current (called "surge current") produced due to the surge voltage flows in the Schottky barrier diode. As a result, it is possible to prevent the Schottky barrier diode from being deteriorated in its rectifying characteristics. It is to be noted that when forward voltage is applied, the current flows in the Schottky barrier diode having a forward voltage drop that is smaller than that of the surge voltage absorbing means such as a voltage regulation diode, with the result that the junction temperature of the voltage regulation diode becomes lower than that of the Schottky barrier diode. For this reason, even if surge voltage is instantaneously applied to the voltage regulation diode whereby surge current transiently flows therein, since the junction temperature of the voltage regulation diode is lower as mentioned above than that of the Schottky barrier diode, the maximum temperature thereof remains lowered.

According to a second aspect of the present invention, there is provided an on-vehicle alternator wherein in the construction according to the first aspect the Schottky barrier diode is fabricated using SiC as a base material. Therefore, the reverse leakage current can be decreased much more than that in the case of Schottky barrier diodes formed using Si as a base material. As a result, it is possible to prevent the battery from becoming short of and decreased in the capacity.

First, the SiC made Schottky barrier junction has the advantage that the leakage current thereof is much smaller though the forward voltage drop thereof is larger, than the Si made Schottky barrier junction. Therefore, it is possible to excellently suppress the discharge of the battery that occurs when no current is generated. Next, the current (leakage current) of the Schottky barrier diode that is produced when reverse voltage has been applied remarkably increases due to a rise in the temperature of the junction portion compared to that of the pn junction diode. For example, the leakage current of the Schottky barrier diode that occurs immediately after engine stop increases much more than that of the pn junction diode. However, since SiC has a heat transfer coefficient that is much smaller than that of Si, the decrease in the junction temperature occurs earlier, thereby enabling expedition of the decrease in the leakage current.

Also, the withstand voltage of SiC in the electric field of the depletion layer is much higher than that of Si therein. That is, the impurity concentration in the voltage withstanding layer (usually n-type) in the vicinity of the junction that is needed in order to realize a high withstand voltage demanded of the on-vehicle alternator can be increased remarkably and the thickness thereof can be decreased remarkably. As a result, it is possible to decrease much more the voltage drop of the rectifying element that is determined depending for the most part on the electric resistance of this voltage withstanding layer than in the prior art. Therefore, it is possible to decrease the power loss and internal temperature elevation when heavy current flows therethrough.

Explaining further, the breakdown field intensity of Si is approximately 30 V$\mu$m. In order for the voltage withstanding layer to undertake the withstand voltage of 300 V, under even the assumption that the electric field intensity in the voltage withstanding layer be fixed when roughly estimated, the thickness of 10 $\mu$m becomes necessary. However, actually, because of non-uniform potential gradient in the depletion layer, a thickness (approximately 20 $\mu$m or so) that is appreciably larger than this thickness becomes necessary. For this reason, in order for 300 V to be undertaken by the depletion layer having a thickness of 20 $\mu$m, it is necessary that the impurity concentration of the voltage withstanding layer be made to be approximately $1 \times 10^{15}$ atoms/cm$^3$ or less, with the result that high resistance, large resistance power loss and large generated heat occur inconveniently. That is, the required thickness of the Si made 300 V voltage withstanding layer is approximately 20 $\mu$m, the impurity concentration thereof is $1 \times 10^{15}$ atoms/cm$^3$ and the resistivity thereof is approximately 5 $\Omega$·cm.

In contrast, the breakdown field intensity of SiC is approximately 400 V/μm, the required thickness of the SiC made 300 V voltage withstanding layer is approximately 4 μm, the impurity concentration thereof is $2 \times 10^{16}$ atoms/cm$^3$ and the resistivity thereof is approximately 1.25 Ω-cm. Accordingly, the resistance of the SiC made voltage withstanding layer can be decreased down to 1/20 of that of the Si made voltage withstanding layer.

According to a third aspect of the present invention, there is provided an on-vehicle alternator wherein in the construction according to the first or second aspect the surge voltage absorbing means includes a voltage regulation diode. By means of this, the surge voltage can be absorbed with ease.

In particular as in a fourth aspect of the present invention, by selecting the voltage regulation diode having a breakdown voltage that is not higher than a theoretical breakdown voltage of the Schottky barrier diode, the surge current that is supplied to the Schottky barrier diode can be made to be almost zero. It is to be noted here that in this case the voltage regulation diode and the Schottky barrier diode preferably are connected in parallel with each other.

In a fifth aspect of the present invention, the voltage regulation diodes according to the third or fourth aspect of the invention are connected to function concurrently as the rectifying elements (at least the rectifying elements that are not Schottky barrier diodes). By means of this, the number of the semiconductor elements can be decreased and the circuit construction can be simplified.

For example, as in a sixth aspect of the present invention, one potential side of the rectifying elements on the high potential side and those on the low potential side may be constituted by the voltage regulation diodes while the other potential side thereof is constituted by the Schottky barrier diodes. According to this, the number of the semiconductor elements can be decreased and the circuit construction can be simplified as mentioned above. Besides, during no-current generation, the voltage regulation diodes whose leakage current is smaller than that of the Schottky barrier diodes are connected in series with the Schottky barrier diodes, with the result that it is possible to suppress discharge of the battery.

Furthermore, in the construction according to the third or fourth aspect of the present invention, the voltage regulation diode may be utilized as neutral point diodes for suppressing fluctuation in the neutral point potential (seventh aspect) that is connected to a neutral point of the armature windings of three-phase star type windings. According to the seventh aspect of the present invention, since the voltage regulation diodes function as a diode for suppressing the potential at the neutral point of the three-phase star type armature windings from fluctuating due to third higher harmonic voltages, the decrease in the number of the semiconductor elements and the simplification of the circuit construction can be achieved.

The surge voltage absorbing means may include a capacitor (eighth aspect). The capacitor may be used independently or in parallel form with the voltage regulation diodes, surge voltage whose waveform sharply rises can be absorbed excellently.

Particularly, if as the capacitor for absorbing this surge voltage there is used the capacitor connected in parallel with the battery, there is brought about the effect that this capacitor can be used also as current supply/reception means for performing supply/reception of, for example, the current that exhibits large periodic fluctuations and as a secondary battery.

According to a ninth aspect of the present invention, there is provided an on-vehicle alternator wherein the Schottky barrier diode has a guard ring composed of a region which has been doped on a substrate of one conductivity type in such a manner as to surround a Schottky barrier junction interface and has an opposite conductivity type, and a high concentration region of one conductivity type that has been doped on the substrate in such a manner as to contact with the guard ring, whereby a pn junction between the guard ring and the region of one conductivity type is caused to function as the voltage regulation diode.

That is to say, the voltage regulation diode can be parasitically formed in the Schottky barrier diode in parallel therewith by causing a partial region of the substrate to be increased in concentration. With this arrangement, it is possible to decrease the number of the semiconductor elements and simplify the circuit construction and wiring and in addition to disperse and absorb the surge current by a large number of voltage regulation diodes.

A tenth aspect of the present invention is characterized by an on-vehicle alternator wherein a circuit that includes the Schottky barrier diode and the battery has a circuit opening switch for releasing the circuit. By means of this, it is possible to prevent discharge of the battery due to the leakage current of the Schottky barrier diodes by opening this switch when no current is being generated.

As the circuit opening switch, a MOS transistor can be utilized. In an on-vehicle alternator according to an eleventh aspect of the present invention, MOS transistors as the circuit opening switch are connected in the rectifier as the rectifying elements of one potential side of the high potential side and the low potential side while the other potential side thereof is constituted by the Schottky barrier diodes. By doing so, it is possible to decrease the number of the semiconductor elements and simplify the circuit construction and wiring. Also, there is no increase in resistance as a result of additional provision of the circuit opening switches.

In the construction according to the eleventh aspect, means for detecting a non-charging state of the battery and means for inhibiting preferentially the conduction of the MOS transistor when the non-charging state has been detected may further be provided. According to the twelfth aspect, since, upon detection of the non-charging state, i.e. upon detection of stop of the output of the charging current to the battery or upon detection of stop of the current generation, the conduction of the MOS transistor is preferentially stopped, it is possible to realize reliable and automatic interruption of the leakage current and resulting prevention of the battery discharge.

Furthermore, the MOS transistors may be each formed using SiC as a base material (thirteenth aspect). By forming the MOS transistors using SiC, the resulting arrangement can be mounted on the generator by the maximum use temperature thereof being increased (180° C.), with the result that it is possible to realize the simplification of the wiring and the decrease in the power loss resulting from the wiring resistance.

Furthermore, the Schottky barrier diodes may be accommodated within a common package together with a voltage regulator for, by controlling a field current supplied to the field windings, regulating the generated current voltage.

According to the fourteenth aspect of the present invention, the construction of the resulting arrangement can be simplified. That is, since the Schottky barrier diodes whose loss is smaller than that of the pn junction diodes have been adopted, the rectifying elements can be integrated with the regulator, which integration was conventionally difficult due to large generated heat, with the result that it is possible to achieve the simplification of the wiring and the miniaturization of the circuit arrangement.

Next, various preferred exemplary embodiments will be explained with reference to drawings.

(First Embodiment)

An on-vehicle alternator according to an embodiment of the present invention will now be explained with reference to a circuit diagram of FIG. 1.

The on-vehicle alternator comprises a Lundell type claw shaped multi-pole field core (not illustrated) wherein a plurality of claws are interlaced with each other in such a fashion as to surround a field winding (rotor coil) 10, an armature core (stator, not illustrated) disposed on the outer-peripheral side of the field core with small gap interposed therebetween and having three-phase armature windings (stator coils) 11, 12 and 13 wound therearound, a rectifier 2 for rectifying generated current voltages of the three-phase armature windings 11, 12 and 13 to thereby charge a battery 3, a capacitor 4 connected in parallel with the battery 3, and a regulator (generated current voltage control means) 5 for performing on/off control of a field current that is supplied to the field winding 10 in correspondence with a battery voltage Vb.

The rectifier 2 comprises diodes 21 to 23 that constitute rectifying elements on the high side and diodes 24 to 26 that constitute rectifying elements on the low side. The anodes of the diodes 21 to 23 are connected individually to output terminals of the armature windings 11 to 13 and the cathodes thereof are connected through a high potential direct current output terminal 20 of the rectifier 2 to respective high potential terminals of the battery 3 and capacitor 4. The cathodes of the diodes 24 to 26 are connected individually to the output terminals of the armature windings 11 to 13 and the anodes thereof are grounded.

The capacitor 4 serves to absorb surge voltage as surge voltage absorbing means and thereby suppress fluctuations in potential of a power source line HL. Simultaneously, it performs current supply and reception in such a manner as to follow high frequency components contained in the fluctuations in potential that occur in correspondence with connection/disconnection of electric loads to thereby decrease the high frequency potential fluctuations that occur in the power source line HL.

The regulator 5 is a circuit that is constructed in an ordinary form. In this regulator 5, a reference voltage Vref that is generated from a reference voltage generating circuit 51 and the battery voltage Vb are compared in a comparator 52, whereby a switching transistor 53 for switching the field current is on/off controlled according to the results of comparison to thereby control the field current that flows in the field winding 10 and thereby regulate the generated current voltage. The reference numeral 54 designates a flyback diode.

Figure 2:
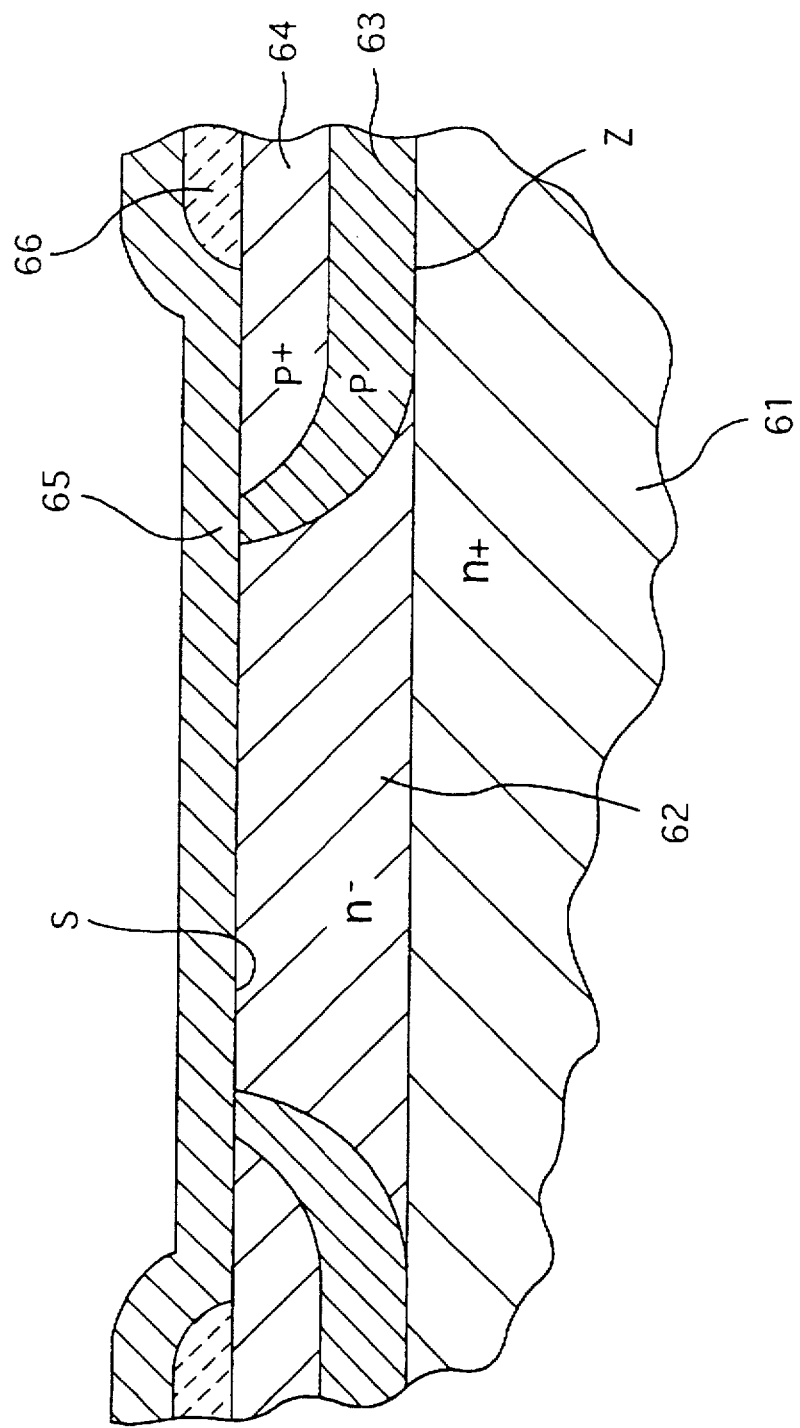
FIG. 2 is a sectional view illustrating the main part of each of the Schottky barrier diodes 21 to 26 of FIG. 1.

An example of the structure of the diodes 21 to 26 will now be explained in more detail with reference to FIG. 2.

On a surface of an $n^+$ substrate 61 there is formed an $n^-$ voltage withstanding layer 62 by epitaxial growth, on a surface of which a p-type guard ring 63 and $p^+$ low resistance region 64 are formed by double ion implantation. On a surface of the $n^-$ voltage withstanding layer 62 surrounded by the p-type guard ring 63 and a surface of the p-type guard ring 63 there is formed, by using a vacuum evaporation system or sputtering system, a metal film 65 that forms a suitable potential barrier, i.e., Schottky barrier junction, between the metal film 65 and the $n^-$ voltage withstanding layer 62. The reference numeral 66 designates a protective insulating film for protecting the chip periphery. A junction interface S between the metal film 65 and the $n^-$ voltage withstanding layer 62 forms a Schottky barrier junction interface that constitutes a Schottky barrier diode. A pn junction Z between the p-type guard ring 63 and the $n^+$ substrate 61 constitutes a voltage regulation diode.

It is to be noted here that it is preferable that the thickness and impurity concentration of the $n^-$ voltage withstanding layer 62 be set to be such conditions that the electric field of the Schottky barrier depletion layer (the electric field at the surface of the $n^-$ voltage withstanding layer 62 in particular) under a rated withstand voltage of the diodes 21 to 26 becomes maximum without being followed by avalanche breakdown. However, this setting operation is well known and an explanation concerned therewith will therefore be omitted.

The p-type guard ring 63 is ohmically contacted with a metal electrode 65 directly or through the intermediary of a $p^+$ low resistance region 64. Accordingly, the pn junction Z is connected in parallel with the Schottky barrier junction S. The avalanche breakdown voltage of the voltage regulation diode constituted by the pn junction Z is determined depending on the thickness and impurity concentration of the p-type guard ring 63 or depending on only the impurity concentration thereof. Here, although it is preferable that the thickness and impurity concentration of the p-type guard ring 63 be set to be such conditions that the electric field of the depletion layer (the electric field at the boundary interface of the $n^+$ substrate 61 in particular) reaches a critical electric field causing an avalanche breakdown under the above-mentioned rated withstand voltage, such setting operation is well known and an explanation concerned therewith will be omitted. In a suitable example, in the case of silicon, the impurity concentration of the $n^-$ voltage withstanding layer 62 suitably is approximately $1\sim9\times10^{15}$ atoms/cm$^3$ and the impurity concentration of the p-type guard ring 63 is approximately $4\times10^{16}$ to $9\times10^{17}$ atoms/cm$^3$.

The operation of this apparatus will be explained hereunder.

The rectifier 2 that constitutes the three-phase full-wave rectifier performs full-wave rectification on the three-phase alternating current voltage as in the case of an ordinary junction diode type three-phase full-wave rectifier to thereby charge the battery 3.

Considering a case where surge voltage has now been applied to part or all of the Schottky barrier diodes 21 to 26 in the reverse bias direction, since the surge voltage that exceeds the above-mentioned rated withstand voltage bypasses the Schottky barrier junction S by the surge current passing through the pn junction Z that forms the voltage regulation diode, the Schottky barrier junction S can be prevented from becoming deteriorated due to instantaneous concentration of heavy current. It is to be noted that the respective resistivities of the regions 63 and 64 are much lower than that of the $n^-$ voltage withstanding layer 62, with the result that even if the area thereof is made smaller than that of the $n^-$ voltage withstanding layer 62, the voltage drop thereof can be made to be small.

Figure 3:
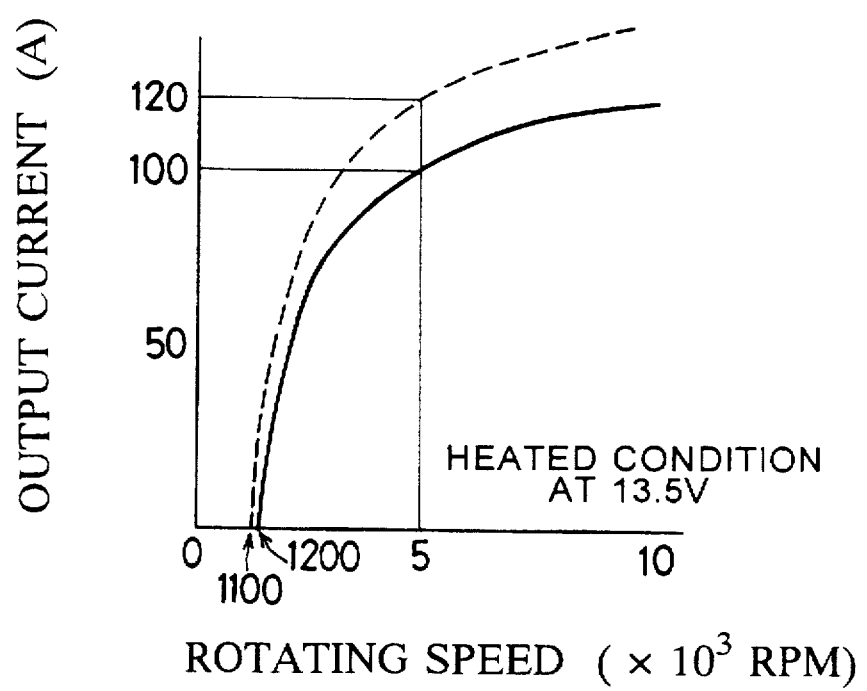
FIG. 3 is a characteristic diagram illustrating comparison between the output characteristics of the on-vehicle alternator of FIG. 1 and a conventional on-vehicle alternator.

In FIG. 3 there is illustrated by actual measured values the relationship between the output (maximum output current) and the rotating speed in each of both cases where pn junction diodes each made using Si as a base material are made to be the rectifying elements (solid line) and where Schottky barrier diodes each made using Si as a base material, each of which uses copper as the metal electrode, are made to be the rectifying elements (broken line).

It is to be noted that in both the rectifying elements the area of the Schottky barrier junction of the Schottky barrier diode were made equal to that of the pn junction of the pn junction diode and the rated withstand voltages were equally made to be 50 V.

It is also to be noted that although in the above-mentioned embodiment the Schottky barrier diodes 21 to 26 have each been fabricated using Si (silicon) as a base material, the resistance of the voltage withstanding layer can be decreased remarkably by using SiC as a base material to thereby enable decrease in the resistance loss.

(Second Embodiment)

Figure 4:
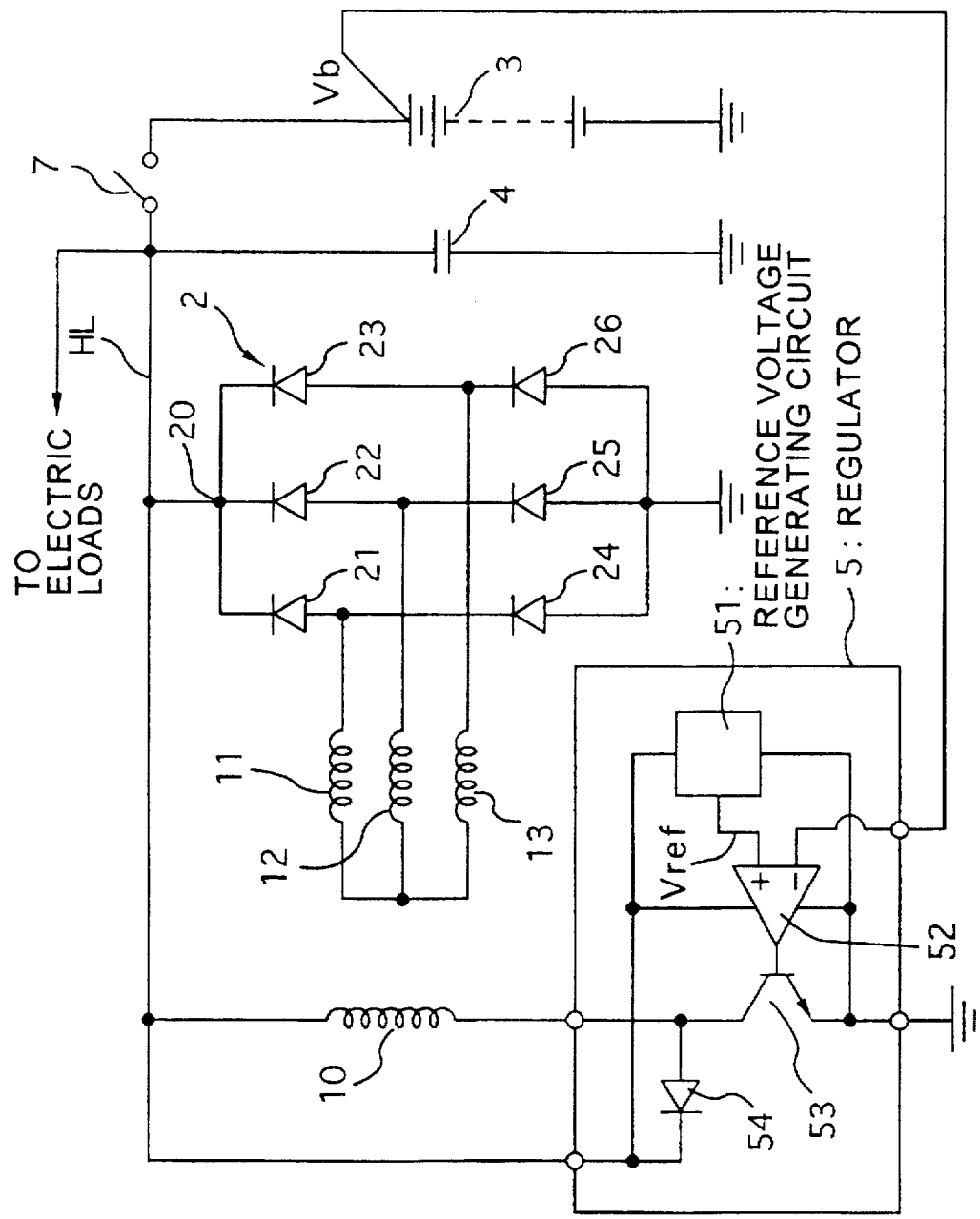
FIG. 4 is a circuit diagram illustrating an on-vehicle alternator according to a second embodiment of the present invention.

A second embodiment will now be explained with reference to FIG. 4.

This embodiment is that wherein in the first embodiment (refer to FIG. 1) a circuit opening switch 7 is interposed between the power source line HL and the high potential terminal of the battery 3. In this embodiment, the circuit opening switch 7 can be opened at a no-current generation time, with the result that it does not happen that the battery capacity decreases due to leakage current of the Schottky barrier diodes 21 to 26 during no-current generation. It is to be noted that although this switch 7 is a manually operable switch, in place thereof a relay or the like capable of functioning as such a switch may be operated by detecting the establishment of a generated current voltage, the establishment of an engine speed or the outflow of a charging current.

(Third Embodiment)

Figure 5:
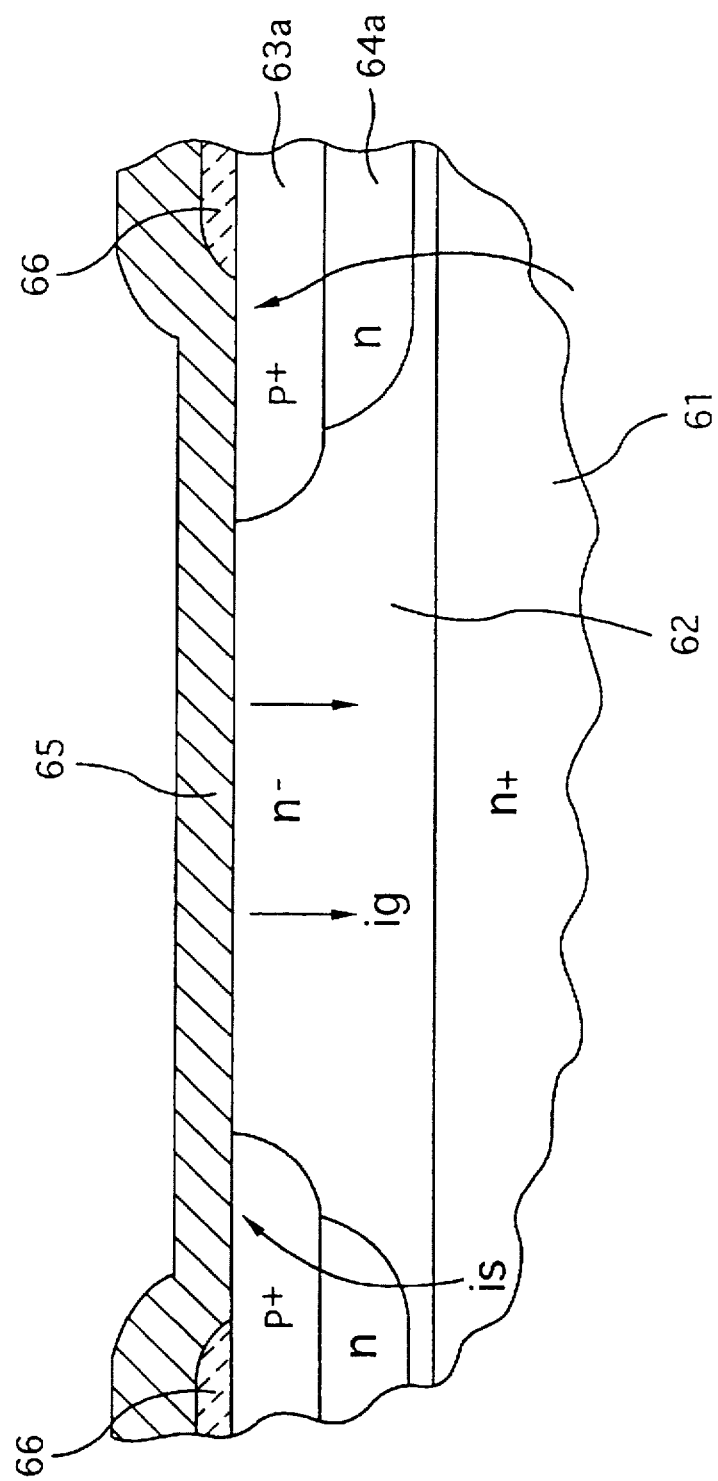
FIG. 5 is a sectional view illustrating the main part of each of the Schottky barrier diodes according to a third embodiment of the present invention.

Another example of the structure of the Schottky barrier diodes 21 to 26 will now be explained with reference to FIG. 5.

In this embodiment, a p+ guard ring 63a and n-type region 64a are formed by double ion implantation that has been performed with respect to the n− voltage withstanding layer 62. Accordingly, in this embodiment, a pn junction portion between the p+ guard ring 63a and n-type region 64a constitutes a voltage regulation diode. The arrow (ig) represents the flow of the forward current that flows through the Schottky barrier diode and the arrow (is) represents the flow of the surge current that flows through the voltage regulation diode.

It is to be noted that it is preferable that the thickness of a portion of the n− voltage withstanding layer 62 between the n-type region 64a and the n+ substrate 61 be as small as possible. This is for the purpose of preventing leakage current (reverse current) that flows through the Schottky barrier junction from increasing by the extent of increase in the voltage drop at this portion that occurs during passage therethrough of surge current.

(Fourth Embodiment)

Figure 6:
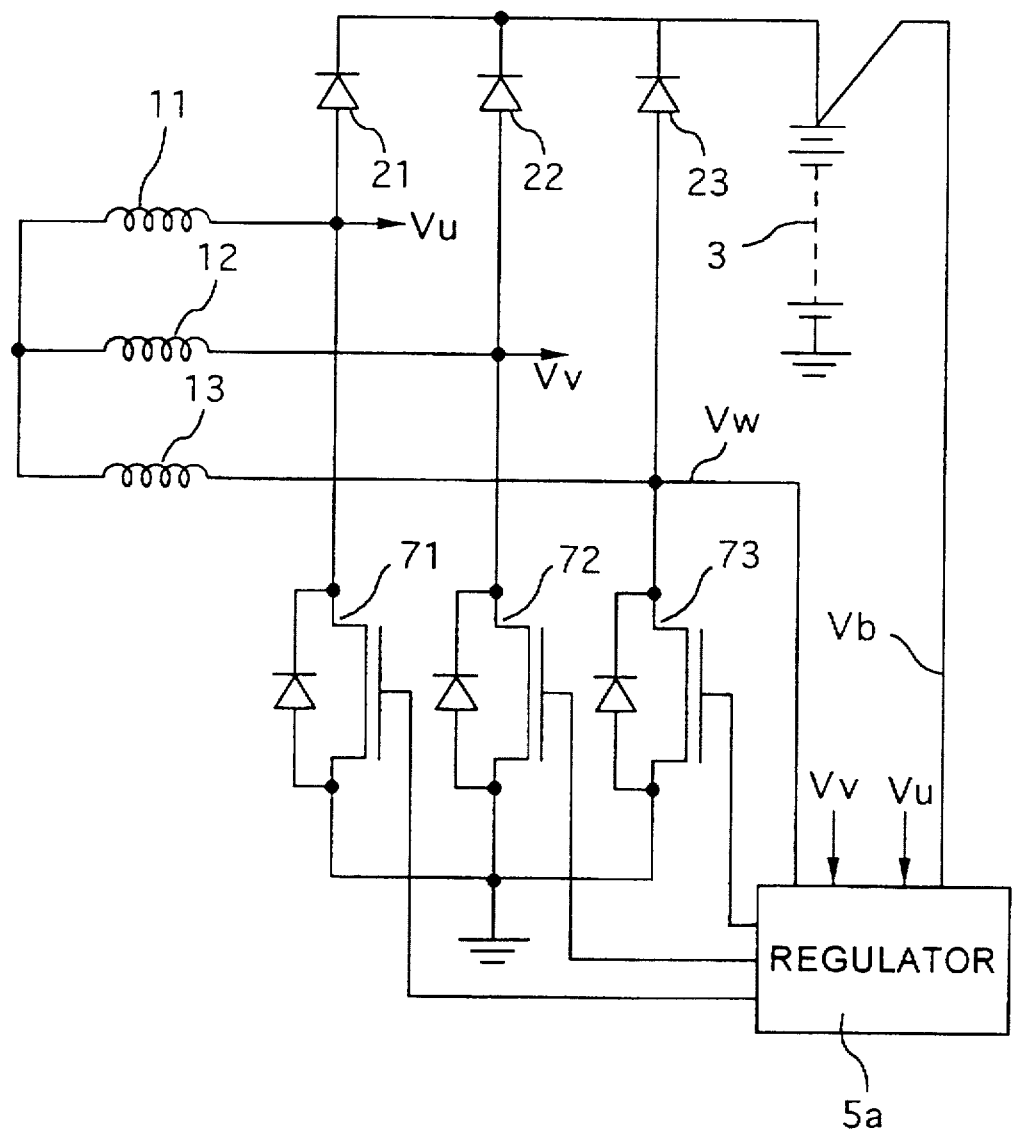
FIG. 6 is a circuit diagram illustrating an on-vehicle alternator according to a fourth embodiment of the present invention.

Still another embodiment will now be explained with reference to FIG. 6.

This embodiment is that wherein the low side Schottky barrier diodes 24 to 26 of the first embodiment (refer to FIG. 1) are replaced with MOS transistors 71 to 73 made of SiC and these MOS transistors 71 to 73 are controlled by a regulator 5a. It is to be noted that the MOS transistors 71 to 73 may of course be disposed at the high side positions, i.e., a side of the Schottky barrier diodes 21 to 23 of FIG. 1. These MOS transistors 71 to 73 are forcedly made "off" at no-current generation time as in the case of the circuit opening switch 7 explained in connection with the second embodiment and thereby function to prevent insufficient charging of the battery.

Figure 7:
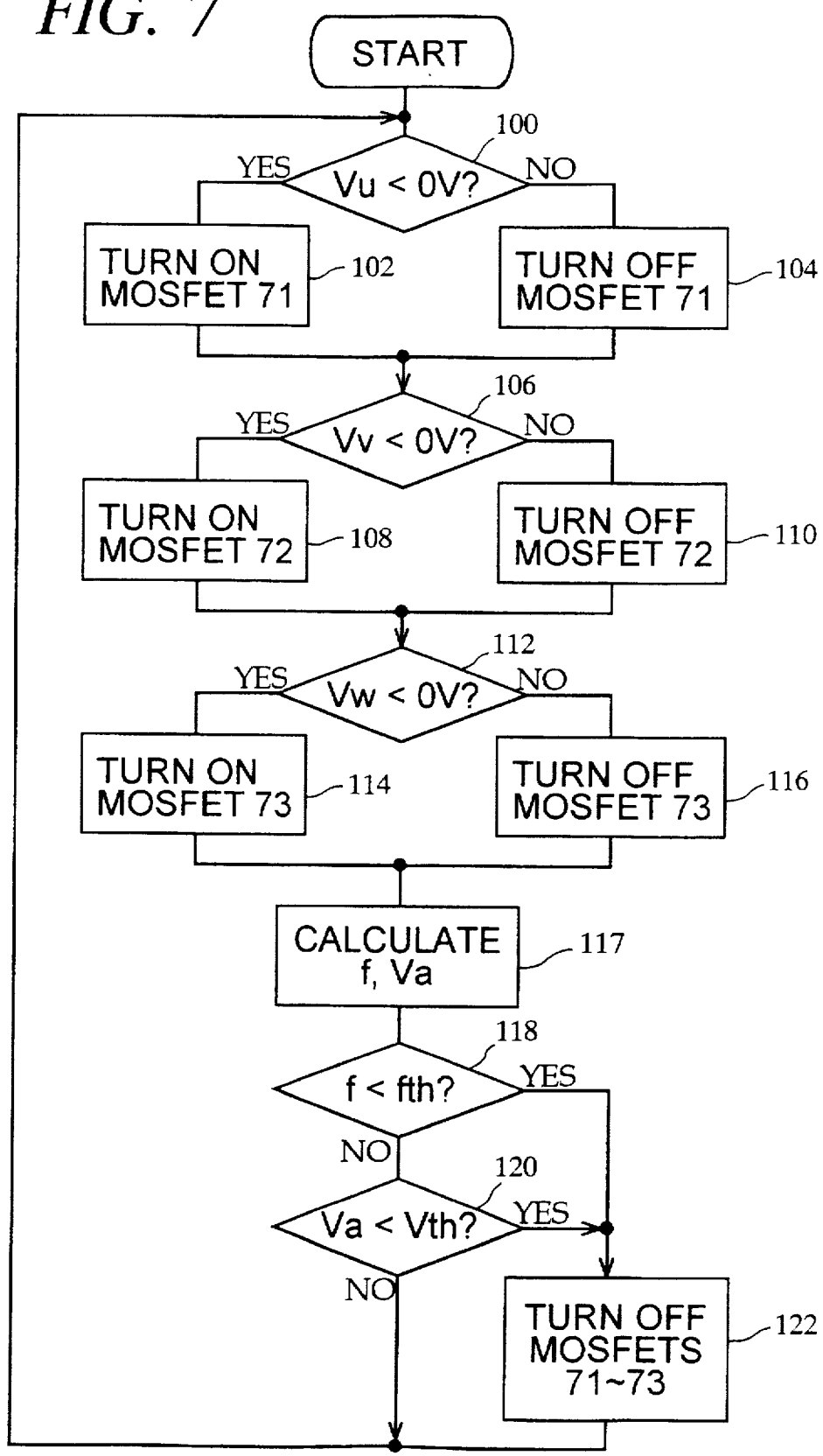
FIG. 7 is a flow chart illustrating the operation of the regulator 5a of FIG. 6.

The control operation for controlling the MOS transistors 71 to 73 by the regulator 5a will now be explained with reference to a flow chart of FIG. 7.

First, it is examined (step 100) whether or not the generated current voltage Vu of the armature winding 11 is smaller than 0 V. If this generated current voltage Vu is smaller, the MOS transistor 71 is made "on" (step 102) whereas if otherwise, the MOS transistor 71 is made "off" (step 104). Next, it is examined (step 106) whether or not the generated current voltage Vv of the armature winding 12 is smaller than 0 V. If this generated current voltage Vv is smaller, the MOS transistor 72 is made "on" (step 108) whereas if otherwise, the MOS transistor 72 is made "off" (step 110). Next, it is examined (step 112) whether or not the generated current voltage Vw of the armature winding 13 is smaller than 0 V. If this generated current voltage Vw is smaller, the MOS transistor 73 is made "on" (step 114) whereas if otherwise, the MOS transistor 73 is made "off" (step 116).

Next, from the read generated current voltage Vu, calculation is performed of the frequency f thereof and the mean voltage Va thereof (step 117), whereupon it is examined whether or not the values as calculated are smaller than prescribed threshold values fth and Vth respectively (steps 118 and 120). If at least one of these values is smaller, it is determined (to be a state of no-current generation) that the battery is not in a state of its being charged, whereby the MOS transistors 71 to 73 are made "off" (step 122). If otherwise, it is determined that the battery is in a state of its being charged, the operation returning to step 100.

(Fifth Embodiment)

Figure 8:
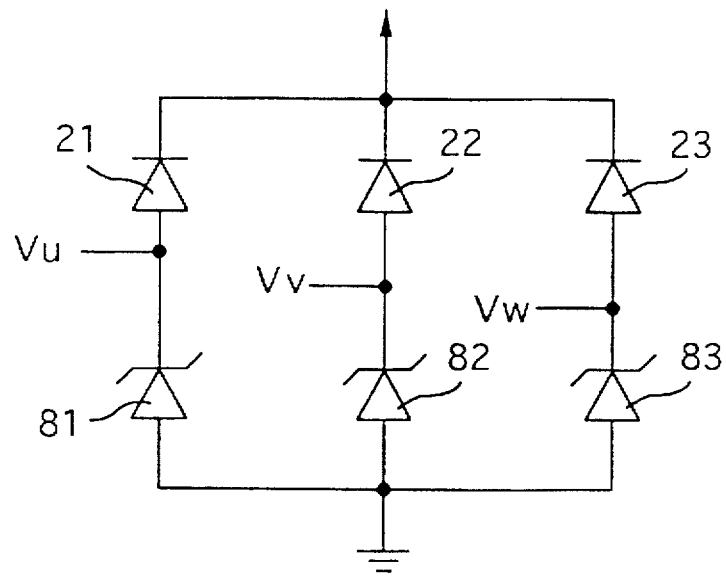
FIG. 8 is a circuit diagram illustrating main parts of an on-vehicle alternator according to a fifth embodiment of the present invention.

A further embodiment will now be described with reference to FIG. 8.

This embodiment is that wherein the low side Schottky barrier diodes 24 to 26 of the first embodiment (refer to FIG. 1) have been replaced with voltage regulation diodes (Zener diodes) 81 to 83. If the arrangement is re-arranged in this fashion, the voltage regulation diodes 81 to 83 not only serve as rectifying elements but also function to absorb surge voltage that is applied to the Schottky barrier diodes 21 to 23. That is, assume, for example, that large surge voltage has been superimposed on the generated current voltage Vu that appears at the output terminal of the armature winding 11. While this surge voltage is applied to the cathodes of the Schottky barrier diodes 22 and 23 through the Schottky barrier diode 21, this surge voltage on the other hand acts to cause the voltage regulation diode 81 to be broken down, with the result that it does not happen that the generated current voltage Vu rises to a level higher than the breakdown voltage of the voltage regulation diode 81. Accordingly, it is possible to prevent deterioration of the Schottky barrier diodes 22 and 23 due to the surge current.

It is to be noted that the voltage regulation diodes 81 to 83 can be constructed using pn junction diodes each having a necessary rated withstand voltage. Since these voltage regulation diodes 81 to 83 also have the effect of interrupting the leakage current of the Schottky barrier diodes 21 to 23 during no-current generation, it is also possible to prevent decrease in the battery capacity during no-current generation. Of course, the rectifying elements on the high side may be constructed using voltage regulation diodes and the rectifying elements on the low side may be constructed using Schottky barrier diodes.

(Sixth Embodiment)

Figure 9:
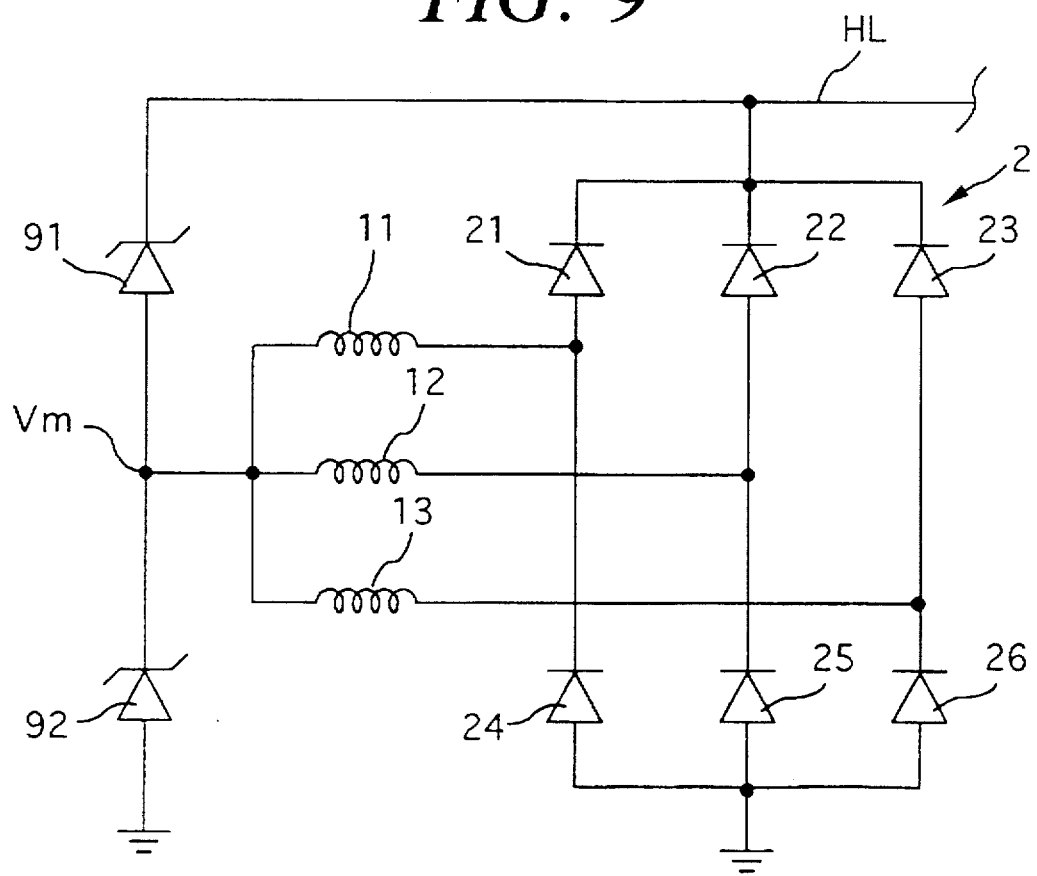
FIG. 9 is a circuit diagram illustrating main parts of an on-vehicle alternator according to a sixth embodiment of the present invention.

A yet further embodiment will now be explained with reference to FIG. 9.

This embodiment is that wherein neutral point diodes 91 and 92 for decreasing the fluctuations in neutral point potential Vm (the fluctuation due to third higher harmonic components in particular) of the star-connected three-phase armature windings 11 to 13 in the first embodiment (refer to FIG. 1) are constructed using voltage regulation diodes, thereby absorbing the surge voltage that is being applied to the Schottky barrier diodes 21 to 26.

That is, if surge voltage has been superimposed on the power source line HL and the resulting potential thereof rises, the voltage regulation diode 91 is broken down and according to the cases the voltage regulation diode 92 is also broken down, with the result that the increase in potential of the power source line HL can be suppressed. On the other hand, if the potential of the neutral point voltage Vm rises due to superimposition of surge voltage thereon, the voltage regulation diode 92 is broken down, with the result that the increase in potential of the neutral point can be suppressed.

That is, the above-explained capacitor 4, pn junction Z, voltage regulation diodes 81 to 83, 91 and 92 constitute the surge voltage absorbing means referred to in the present invention. Of course, voltage regulation diodes can be also connected in parallel with the Schottky barrier diodes 21 to 26 individually.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An alternator comprising:

alternating current generating means for generating polyphase alternating current, having output terminals connected to polyphase armature windings;

a full-wave rectifier including first rectifying elements on a high potential side, anodes of which are connected individually to said respective output terminals of said polyphase armature windings and cathodes of which are connected individually to a high potential terminal of a battery, and second rectifying elements on a low potential side, cathodes of which are connected individually to said respective output terminals of said polyphase armature windings and anodes of which are connected individually to a low potential terminal of said battery, wherein at least one of said first and second rectifying elements is constituted by Schottky barrier diodes; and a surge voltage absorbing device disposed in parallel to said Schottky barrier diodes for absorbing surge voltage applied from said polyphase armature windings to said Schottky barrier diodes when said polyphase armature windings generate said surge voltage.

2. An alternator as set forth in claim 1, wherein at least one of said Schottky barrier diodes is fabricated using SiC as a base material.

3. An alternator as set forth in claim 1, wherein said surge voltage absorbing device includes a voltage regulation diode.

4. An alternator as set forth in claim 3, wherein said voltage regulation diode is selected to have a breakdown voltage lower than a breakdown voltage of said Schottky barrier diodes.

5. An alternator as set forth in claim 3, wherein said voltage regulation diode functions concurrently as one of said first and second rectifying elements.

6. An alternator as set forth in claim 5, wherein one of said first and second rectifying elements is constituted by said Schottky barrier diodes and the other of said first and second rectifying elements is constituted by said voltage regulation diodes.

7. An alternator as set forth in claim 3, wherein said polyphase armature windings form a three-phase star connection, and said voltage regulation diode forms a circuit for suppressing fluctuation in a potential of a neutral point of said three-phase star connection.

8. An alternator as set forth in any one of claims 1 through 7, wherein said surge voltage absorbing device includes a capacitor.

9. An alternator as set forth in claim 3 or 4, wherein at least one of said Schottky barrier diodes comprises:

a semiconductor substrate of a first conductivity type;

a metal contacting said semiconductor substrate to form a Schottky barrier junction with said semiconductor substrate, whereby said at least one Schottky barrier diode is formed; and a guard ring of a second conductivity type, disposed on said semiconductor substrate to surround said Schottky barrier junction, and ohmically contacting said metal, whereby a pn junction between said semiconductor substrate and said guard ring forms said voltage regulation diode.

10. An alternator as set forth in claim 1, wherein a circuit that includes said Schottky barrier diodes and said battery has a circuit opening switch for releasing said circuit.

11. An alternator as set forth in claim 10, wherein said circuit opening switch is constituted by MOS transistors that constitute said rectifying elements on said high or low potential side other than a side where said Schottky barrier diodes are connected as said at least one of said first and second rectifying elements.

12. An alternator as set forth in claim 11, further comprising:

means for detecting a non-charging state of said battery; and means for controlling said MOS transistors to be turned off when said non-charging state is detected by said detecting means.

13. An alternator as set forth in claim 11, wherein said MOS transistors are each formed using SiC as a base material.

14. An alternator as set forth in claim 1, further comprising a voltage regulator for, by controlling a field current supplied to a field winding of said alternating current generating means, regulating a generated current voltage, said Schottky barrier diodes being accommodated within a common package together with said voltage regulator.

* * * * *